Patented June 10, 1947

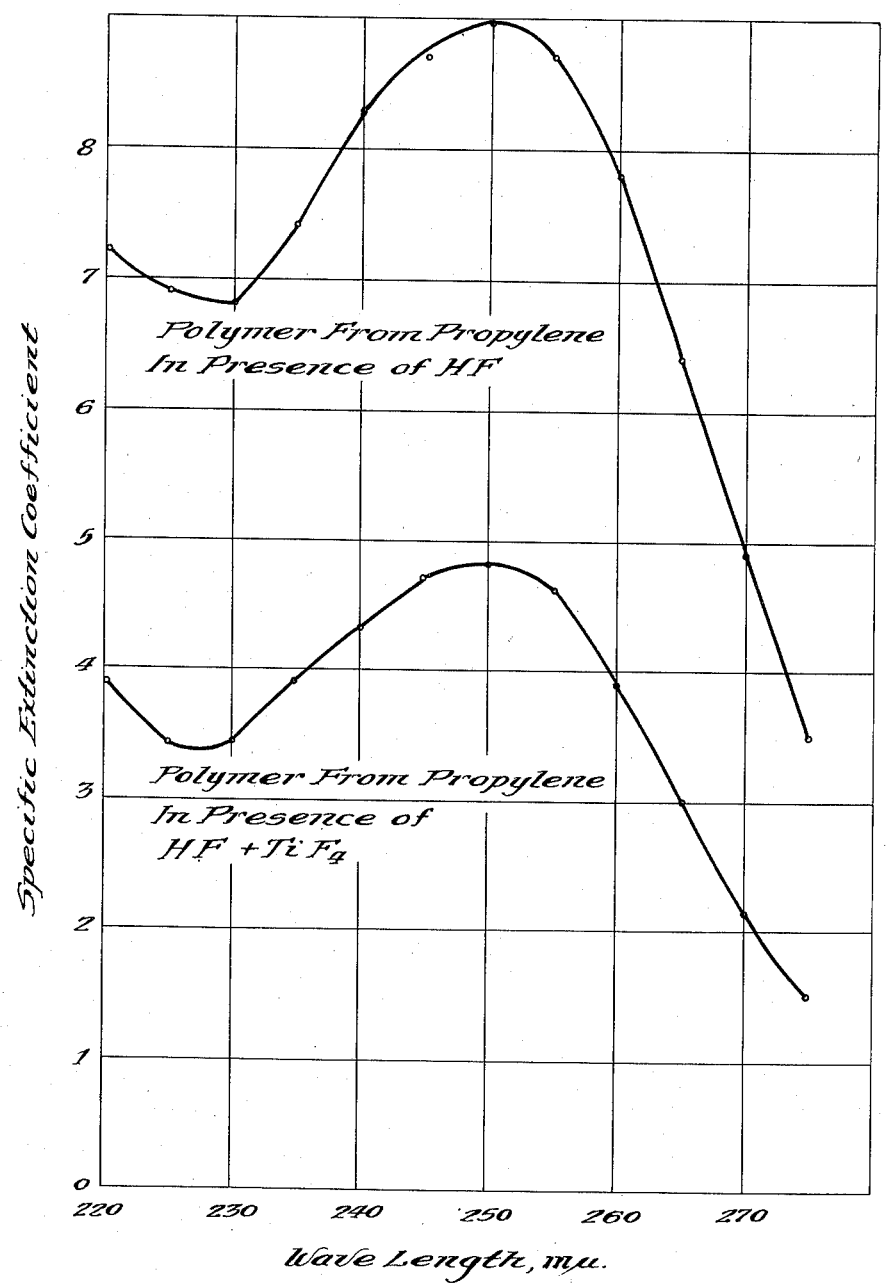

2,421,950

UNITED STATES PATENT OFFICE 2,421,950

POLYMERIZATION OF OLEFINIC HYDROCARBONS

Carl B. Linn, Riverside, Ill., assignor to Universal Oil Products Company, Chicago, Ill., a corporation of Delaware Application May 31, 1945, Serial No. 596,923

9 Claims. (Cl. 260—683.15)

1

This invention relates to the polymerization of olefinic hydrocarbons in the presence of a special type of catalyst. More particularly, this invention relates to the polymerization of propylene and butylenes into normally liquid hydrocarbons boiling within the approximate range of gasoline.

An object of this invention is to polymerize olefinic hydrocarbons in the presence of a liquid catalytic material.

Another object of this invention is to convert propylene and butylenes into normally liquid hydrocarbons in the presence of a liquid catalyst.

A further object of this invention is to polymerize olefinic hydrocarbons including mono-olefins and polyolefins in the presence of a catalyst mixture comprising hydrogen fluoride as its essential active ingredient and an inorganic diluent boiling below about 300° C.

The single figure of the drawing is a chart in which certain properties of the product are plotted in the form of curves.

In one specific embodiment this invention relates to a process for producing hydrocarbons of higher molecular weight which comprises reacting an olefinic hydrocarbon having at least 3 carbon atoms per molecule at polymerizing conditions in the presence of liquid hydrogen fluoride and an inorganic compound which is soluble in said hydrogen fluoride and boils below about 300° C., said inorganic compound being selected from the group consisting of the fluorides and oxy-fluorides of sulfur, selenium, nitrogen, phosphorus, molybdenum, titanium, tungsten, vanadium, and silicon.

Another embodiment of this invention relates to a polymerization process which comprises reacting an olefinic hydrocarbon having at least 3 carbon atoms per molecule in the presence of a major proportion by weight of liquid hydrogen fluoride and a minor proportion by weight of an inorganic compound which is soluble in said hydrogen fluoride and boils below about 300° C., said inorganic compound being selected from the group consisting of the fluorides and oxy-fluorides of sulfur, selenium, nitrogen, phosphorus, molybdenum, titanium, tungsten, vanadium, and silicon.

A further embodiment of this invention relates to a polymerization process which comprises reacting a mono-olefinic hydrocarbon having at least 3 carbon atoms per molecule in the presence of liquid hydrogen fluoride and an inorganic compound which is soluble in said hydrogen fluoride and boils below about 300° C., said inorganic compound being selected from the group consisting of the fluorides and oxy-fluorides of sulfur, selenium, nitrogen, phosphorus, molybdenum, titanium, tungsten, vanadium, and silicon.

Broadly, this invention relates to the polymerization of olefinic hydrocarbons in the presence of hydrogen fluoride and at least one member of the group consisting of inorganic fluorides and oxyfluorides having a boiling point below about 300° C.

Normally gaseous and liquid olefinic hydrocarbons which are polymerizable by the process of the present invention occur together with paraffinic or saturated hydrocarbons in commercial hydrocarbon mixtures such as those encountered in the cracking of petroleum, in gas making processes, and as by-products of various chemical industries. Normally gaseous mono-olefins, such as propylene and butylenes, and normally liquid olefins including amylenes, hexenes, and higher olefins, may be obtained also by catalytic dehydrogenation of paraffins, by pyrolysis of certain paraffinic hydrocarbons, and by dehydration of alcohols. Polyolefins and cyclic olefins are also olefinic hydrocarbons which may be polymerized in my process and these hydrocarbons include particularly butadiene, isoprene, cyclohexene, alkyl cyclohexenes, and cyclopentene hydrocarbons.

In general, olefins have a relatively high activity and even under mild catalytic influence they exhibit this activity by their pronounced tendency to polymerize and form substances of higher molecular weights. This process is particularly effective for converting propylene and butylenes into normally liquid polymers.

The present process is directed particularly to the production of polymers containing from about 6 to about 12 and more carbon atoms per molecule from propylene and butylenes. The preferred polymer products boil at temperatures within the approximate boiling range of commercial gasoline. These polymers containing from about 6 to about 12 carbon atoms per molecule are useful for blending with straight-run gasoline to increase its antiknock value.

The spacing agents or diluents which are employed in the present invention are inorganic fluorides and oxyfluorides which are soluble to a substantial extent in liquid hydrogen fluoride and which boil below about 300° C. The preferred compounds are the low boiling fluorides and oxyfluorides of sulfur, selenium, nitrogen, phosphorous, molybdenum, titanium, tungsten, vanadium, and silicon. Of the last named compounds the fluorides and oxy-fluorides of silicon are most readily obtained, particularly silicon tetrafluoride. Most of these fluorides and oxy-fluorides are normally gaseous compounds but are soluble to a useful extent in hydrogen fluoride. A few of the compounds are liquids or solids at ordinary temperatures and pressures. A tabulation of the principal inorganic compounds of this class and their physical properties is presented as follows:

| Compound | Melting Point, °C. | Boiling Point, °C. |
|---|---|---|
| $SF_4$ | 1—55 | —63.5 |
| $S_2F_2$ | —105.5 | —99 |
| $SOF_2$ | —110 | —30 |
| $SO_2F_2$ | 2—120 | —52 |
| $SeF_4$ | —80 | 100 |
| $SeF_6$ | —39 | —34.5 |
| $SeOF_2$ | 4.6 | 124 |
| $NOF$ | —134 | —56 |
| $NO_2F$ | —139 | —63.5 |
| $POF_3$ | —68 | —40 |
| $PF_3$ | —160 | —95 |
| $PF_5$ | —83 | —75 |
| $MoF_6$ | 17 | 35 |
| $MoOF_4$ | 98 | 180 |
| $TiF_4$ |  | 284 |
| $WF_6$ | 2.5 | 19.5 |
| $WOF_4$ | 110 | 185—190 |
| $VF_5$ |  | 111.2 |
| $SiF_4$ | —77 | —65 |

1 Under pressure.
2 65 m. m. pressure.

By the addition to liquid hydrogen fluoride of the herein described inorganic compounds which are soluble in hydrogen fluoride and boil below about 300° C., the ordinarily vigorous activity of hydrogen fluoride in catalyzing polymerization of olefinic hydrocarbons is moderated. Thus, I have found that substantial yields of liquid polymers of relatively low molecular weights are produced when propylene, butyleness, and higher olefins are reacted at temperatures of from about —50° to about 250° C., but preferably at a temperature of from about 20° to about 150° C. in the presence of a catalyst comprising essentially a major proportion by weight of liquid hydrogen fluoride and a minor proportion by weight of an inorganic compound soluble in said hydrogen fluoride and boiling below about 300° C. Said inorganic compound is selected from the group consisting of the fluorides and oxy-fluorides of sulfur, selenium, nitrogen, phosphorus, molybdenum, titanium, tungsten, vanadium, and silicon. The polymerization treatment is generally carried out at a pressure sufficient to maintain the charged hydrocarbons and catalyst in substantially liquid phase. Also, the treatment of the olefinic charging stock in the presence of the catalyst employs a contact time of from about 30 seconds to as much as 5 hours, depending upon the nature of the olefinic charging stock, the concentration of olefinic hydrocarbons therein, and also upon the properties desired in the polymer product. The inorganic flouride, oxy-fluoride, or mixture thereof used as a diluent or spacing agent as herein described, is present to the extent of from about 1 to about 50% by weight of the hydrogen fluoride. The catalyst mixture present in a polymerization reaction mixture is generally at least about 5% by weight of the olefins present.

Accordingly, the present invention deals with a polymerizing catalyst in which the polymerizing activity of hydrogen fluoride is controlled or modified by the addition to said hydrogen fluoride of an inorganic compound soluble therein boiling below about 300° C. and selected from the group consisting of the fluorides and oxy-fluorides of sulfur, selenium, nitrogen, phosphorus, molybdenum, titanium, tungsten, vanadium, and silicon.

The addition of these compounds or spacing agents to liquid hydrogen fluoride influences the polymerization of mono-olefinic hydrocarbons in such a way as to improve the yield and quality of relatively low boiling normally liquid hydrocarbons. In fact, the polymers formed in the presence of my catalyst mixture comprising hydrogen fluoride and a spacing agent differ considerably from polymers formed from the same olefinic charging stock but in the presence of substantially anhydrous hydrogen fluoride and in the absence of a spacing agent. In the presence of my mixed catalyst, mono-olefinic hydrocarbons are converted into polymers comprising essentially the mono-olefinic hydrocarbons, whereas in the presence of substantially anhydrous hydrogen fluoride, the same mono-olefinic hydrocarbon charging stock undergoes what may be termed conjunct polymerization and forms a complex mixture of hydrocarbons containing paraffins, olefins, cyclic hydrocarbons, and relatively high proportions of conjugated diolefinic hydrocarbons.

The presence of conjugated diolefinic hydrocarbons in the polymer formed under the influence of hydrogen fluoride as the sole catalyst is evidenced by the so-called specific extinction coefficient obtained by ultra-violet absorption analysis of the hydrocarbon products. In order to interpret the results of these ultra-violet absorption analyses, use is made of the "specific extinction coefficient", which is equal to $$\frac{\log_{10}\frac{I_0}{I}}{CL}$$

where $I_0$ = intensity of incident light (cell filled with iso-octane)
$I$ = intensity of transmitted light (cell filled with solution of polymer in iso-octane solvent)
$C$ = concentration of polymer in cell in grams per liter
$L$ = length of cell path in centimeters Iso-octane, more exactly known as 2,2,4-trimethylpentane, is employed as the solvent since this octane gives substantially no ultra-violet absorption in the region examined.

Other work on various hydrocarbons of known structures has indicated that a high specific extinction coefficient in the region around 250 m$\mu$ denotes the presence in said hydrocarbons of a relatively high proportion of conjugated unsaturation.

My polymerization process may be carried out in a batch operation but it is effected preferably in continuous types of operation. In batch type treatment an olefinic hydrocarbon, and generally a mono-olefinic hydrocarbon or a hydrocarbon fraction containing mono-olefins, may be agitated in an autoclave or other reactor of suitable design with a mixture of hydrogen fluoride and an inorganic compound soluble therein, boiling below about 300° C. and selected from the group consisting of the fluorides and oxy-fluorides of sulfur, selenium, nitrogen, phosphorus, molybdenum, titanium, tungsten, vanadium, and silicon.

Continuous operation of my process may be carried out by passing a mixture of an olefin-containing hydrocarbon fraction and a mixture of hydrogen fluoride and a spacing agent through a suitable reactor or group of reactors, separating liquid polymers from unconverted olefins and catalyst mixture, and recycling the unconverted olefins and catalyst mixture to the polymerization zone of the process. It is usually necessary to include a cooling zone or other heat exchange means in the polymerization zone or between such zones, the latter procedure being often used, if a multiple polymerization reactor system is employed.

From the statements hereinabove set forth concerning the types of inorganic compounds boiling below about 300° C. which may be employed as diluents or spacing agents for hydrogen fluoride, it will be evident that a large number of catalyst composites of various compositions may be made according to the needs of different polymerization reactions but the different diluents or spacing agents are not necessarily equivalent in their action.

While in many cases the activity of the composite polymerizing catalyst employed is due principally to the hydrogen fluoride contained therein, it is recognized that the inorganic diluent which is added thereto may at times exert a definite chemical influence upon the reactions other than merely moderating the effect of the hydrogen fluoride. It is also evident that the selection of any particular diluent or mixture of diluents for use with hydrogen fluoride is determined largely by solubility relations, the ease of polymerizing the olefinic hydrocarbons involved, the general operating conditions, and the matter of economy in the cost of the reagents.

The following example is given to indicate results obtained by the present process, although with no intention of limiting the scope of the invention in exact correspondence with the numerical results.

150 grams of propylene, 81 grams of liquid hydrogen fluoride of 99% concentration, and 20 grams of titanium tetrafluoride were contacted at 95° C. for two hours in an autoclave equipped with a pressure-sealed stirring device. The reaction product consisted of 144 grams of liquid hydrocarbons and 3 grams of isopropyl fluoride. The hydrocarbon product was water washed, dried, and examined as shown in the table.

Table

| Run No. | 1 | 2 |
|---|---|---|
| Temperature, ° C | 95 | 95 |
| Contact Time, Hours | 2 | 2 |
| Charged grams: | | |
| Propylene | 150 | 150 |
| Hydrogen Fluoride | 81 | 87 |
| Titanium Fluoride (tetra) | 20 | 0 |
| Recovered grams: | | |
| Liquid Polymer | 144 | 143 |
| Isopropyl Fluoride | 3 | 6 |
| Properties of Product: | | |
| $n_D^{20}$ | 1.4500 | 1.4567 |
| Wt. per cent Fluorine | | .12 |
| Bromine Number | 53 | 79 |
| Molecular Weight | | 240 |
| Wt. per cent 204° C. E. P. gasoline | 25 | 22 |
| Ultra-violet absorption analysis | Specific Extinction Coefficient | |
| Wave Length m$\mu$— | | |
| 220 | 3.9 | 7.2 |
| 225 | 3.4 | 6.9 |
| 230 | 3.4 | 6.8 |
| 235 | 3.9 | 7.4 |
| 240 | 4.3 | 8.3 |
| 245 | 4.7 | 8.7 |
| 250 | 4.8 | 9.0 |
| 255 | 4.6 | 8.7 |
| 260 | 3.9 | 7.8 |
| 265 | 3.0 | 6.4 |
| 270 | 2.1 | 4.9 |
| 275 | 1.5 | 3.5 |

Examination of the chart shown in the attached drawing in which the ultra-violet absorption data are plotted shows how the character of the polymer from hydrogen fluoride alone is altered by the addition of titanium fluoride to the reacting system. The lower extinction coefficient observed at about 250 m$\mu$ in the latter case indicates less formation of diolefins and a greater concentration of simple polymer.

The foregoing specification and example indicate the character of the process of the present invention and the nature of the results obtained, although neither section is introduced to unduly limit the generally broad scope of the invention.

I claim as my invention:

1. A polymerization process which comprises reacting an olefinic hydrocarbon having at least 3 carbon atoms per molecule in the presence of a catalyst comprising a major proportion by weight of liquid hydrogen fluoride having dissolved therein a minor proportion by weight of an inorganic compound soluble in liquid hydrogen fluoride and boiling below about 300° C., said compound being selected from the group consisting of the fluorides and oxy-fluorides of sulfur, selenium, nitrogen, phosphorus, molybdenum, titanium, tungsten, vanadium, and silicon.

2. A polymerization process which comprises reacting an olefinic hydrocarbon having at least 3 carbon atoms per molecule at a temperature of from about —50° to about 250° C. in the presence of a catalyst comprising a major proportion by weight of liquid hydrogen fluoride having dissolved therein a minor proportion by weight of an inorganic compound soluble in liquid hydrogen fluoride and boiling below about 300° C., said compound being selected from the group consisting of the fluorides and oxy-fluorides of sulfur, selenium, nitrogen, phosphorus, molybdenum, titanium, tungsten, vanadium, and silicon.

3. A polymerization process which comprises reacting a mono-olefinic hydrocarbon having at least 3 carbon atoms per molecule at a temperature of from about —50° to about 250° C. in the presence of a catalyst comprising a major proportion by weight of liquid hydrogen fluoride having dissolved therein a minor proportion by weight of an inorganic compound soluble in liquid hydrogen fluoride and boiling below about 300° C., said compound being selected from the group consisting of the fluorides and oxy-fluorides of sulfur, selenium, nitrogen, phosphorus, molybdenum, titanium, tungsten, vanadium, and silicon.

4. A polymerization process which comprises reacting a mono-olefinic hydrocarbon having at least 3 carbon atoms per molecule at a temperature of from about 20° to about 150° C. in the presence of a catalyst comprising a major proportion by weight of liquid hydrogen fluoride having dissolved therein a minor proportion by weight of an inorganic compound soluble in liquid hydrogen fluoride and boiling below about 300° C., said compound being selected from the group consisting of the fluorides and oxy-fluorides of sulfur, selenium, nitrogen, phosphorus, molybdenum, titanium, tungsten, vanadium, and silicon.

5. A polymerization process which comprises reacting a mono-olefinic hydrocarbon having at least 3 carbon atoms per molecule at a temperature of from about 20° to about 150° C. in the presence of a catalyst comprising a major proportion by weight of liquid hydrogen fluoride having dissolved therein a minor proportion by weight of an inorganic compound soluble in liquid hydrogen fluoride and boiling below about 300° C., said compound being selected from the group consisting of the fluorides and oxy-fluorides of sulfur, selenium, nitrogen, phosphorus, molybdenum, titanium, tungsten, vanadium, and silicon, and at a pressure sufficient to maintain the reaction mixture in substantially liquid state.

6. A polymerization process which comprises reacting a normally gaseous mono-olefinic hydrocarbon having at least 3 carbon atoms per molecule at a temperature of from about 20° to about 150° C. in the presence of a catalyst comprising a major proportion by weight of liquid hydrogen fluoride having dissolved therein a minor proportion by weight of an inorganic compound soluble in liquid hydrogen fluoride and boiling below about 300° C., said compound being selected from the group consisting of the fluorides and oxy-fluorides of sulfur, selenium, nitrogen, phosphorus, molybdenum, titanium, tungsten, vanadium, and silicon.

7. A polymerization process which comprises reacting a mono-olefinic hydrocarbon having at least 3 carbon atoms per molecule at a temperature of from about −50° to about 250° C. in the presence of a solution of a minor proportion by weight of titanium tetrafluoride in a major proportion by weight of liquid hydrogen fluoride.

8. In the polymerization of olefinic hydrocarbons of at least 3 carbon atoms to the molecule in the presence of a catalyst predominating in liquid hydrogen fluoride, the improvement which comprises dissolving in the liquid hydrogen fluoride a minor proportion by weight of an inorganic compound soluble in liquid hydrogen fluoride and boiling below about 300° C., said compound being selected from the group consisting of the fluorides and oxy-fluorides of sulfur, selenium, nitrogen, phosphorus, molybdenum, titanium, tungsten, vanadium and silicon.

9. In the polymerization of olefinic hydrocarbons of at least 3 carbon atoms to the molecule in the presence of a catalyst predominating in liquid hydrogen fluoride, the improvement which comprises dissolving in the liquid hydrogen fluoride a minor proportion by weight of titanium tetrafluoride.

CARL B. LINN.

REFERENCES CITED

The following references are of record in the file of this patent:

UNITED STATES PATENTS

| Number | Name | Date |
|---|---|---|
| 2,181,640 | Deanesly et al. | Nov. 28, 1939 |